United States Patent
Sanada et al.

(10) Patent No.: US 6,484,245 B1
(45) Date of Patent: Nov. 19, 2002

(54) APPARATUS FOR AND METHOD OF ACCESSING A STORAGE REGION ACROSS A NETWORK

(75) Inventors: Akemi Sanada, Minamiashigara; Toshio Nakano, Chiagasaki; Hidehiko Iwasaki, Hiratsuka; Masahiko Sato, Odawara; Kenji Muraoka, Odawara; Kenichi Takamoto, Odawara; Masaaki Kobayashi, Odawara, all of (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/085,864

(22) Filed: May 28, 1998

(30) Foreign Application Priority Data

May 29, 1997 (JP) .............................................. 9-140029

(51) Int. Cl.$^7$ .............................................. G06F 13/00

(52) U.S. Cl. ........................ 711/164; 711/152; 711/163; 711/111

(58) Field of Search ................................. 711/152, 163, 711/164, 202–207, 221, 111, 114; 370/351–360, 389–394; 710/36–38

(56) References Cited

U.S. PATENT DOCUMENTS

| 4,914,656 A | 4/1990 | Dunphy, Jr. et al. ........ 714/710 |
| 4,989,205 A | 1/1991 | Dunphy, Jr. et al. ............ 714/6 |

(List continued on next page.)

FOREIGN PATENT DOCUMENTS

| JP | 63-253448 | 10/1988 |
| JP | 3-152650 | 6/1991 |
| JP | 5-181609 | 7/1993 |
| JP | 5-324445 | 12/1993 |
| JP | 6-95859 | 4/1994 |
| JP | 6-214863 | 8/1994 |
| JP | 8-115279 | 5/1996 |

OTHER PUBLICATIONS

Lee et al., "Petal: Distributed Virtual Disks", The Proceedings of the 7$^{th}$ International Conference on Architectural Support for Programming Languages and Operating Systems (ASPLOS), Cambridge, Mass., Oct. 7, 1996, pp. 1–9.
Smith et al., "Tachyon: a gigabit Fibre Channel protocol chip", Hewlett–Packard Journal, vol. 47, No. 5, Oct. 1996, pp. 94–98, internet copy.
Gibson et al., "A Case for Network–Attached Secure Disks", Document CMU–CS–96–142, School of Computer Science, Carnegie Mellon University, Sep. 26, 1996, pp. 1–19.
Gibson et al., "File Server Scaling with Network–Attached Secure Disks", Proceedings of the 1997 ACM Sigmetrics International Conference on Measurement & Modeling of Computer Systems, Jun. 1997, pp. 272–284.
Van Meter III, "A Brief Survey of Current Work on Network Attached Peripherals", ACM SIGOPS, Operating Systems Review, v. 30, N. 1, Jan. 1996, pp. 63–70, internet copy.

(List continued on next page.)

Primary Examiner—Than Nguyen
(74) Attorney, Agent, or Firm—Dickstein Shapiro Morin & Oshinsky LLP

(57) ABSTRACT

N_Port_Name information capable of distinctly identifying a host computer has seen set in a microprocessor 42 of a storage controller 40 prior to start-up of host computers 10, 20, 30; upon startup of the host computers 10, 20, 30, when the storage controller 40 receives a frame issued, then the microprocessor 42 operates to perform comparison for determining whether the N_Port_Name information stored in the frame has been already set in the microprocessor 42 and registered to the N_Port_Name list within a control table maintained. When such comparison results in match, then continue execution of processing based on the frame instruction; if comparison results in failure of match, then reject any request.

24 Claims, 11 Drawing Sheets

U.S. PATENT DOCUMENTS

| | | | |
|---|---|---|---|
| 5,077,736 A | 12/1991 | Dunphy, Jr. et al. | 714/7 |
| 5,124,987 A | 6/1992 | Milligan et al. | 714/7 |
| 5,163,096 A | 11/1992 | Clarke et al. | 711/164 |
| 5,210,844 A * | 5/1993 | Shimura et al. | 711/153 |
| 5,237,668 A | 8/1993 | Blandy et al. | 711/163 |
| 5,239,632 A | 8/1993 | Larner | 710/126 |
| 5,274,783 A * | 12/1993 | House et al. | 710/101 |
| 5,282,247 A | 1/1994 | McLean et al. | 380/4 |
| 5,297,268 A * | 3/1994 | Lee et al. | 711/164 |
| 5,469,564 A | 11/1995 | Junya | 713/202 |
| 5,528,584 A | 6/1996 | Grant et al. | 370/58.2 |
| 5,533,125 A | 7/1996 | Bensimon et al. | 380/4 |
| 5,548,783 A | 8/1996 | Jones et al. | 710/101 |
| 5,610,746 A * | 3/1997 | Ranalli | 359/140 |
| 5,623,637 A | 4/1997 | Jones et al. | 711/164 |
| 5,644,789 A | 7/1997 | Matthews et al. | 710/36 |
| 5,651,139 A | 7/1997 | Cripe et al. | 711/163 |
| 5,657,445 A | 8/1997 | Pearce | 713/200 |
| 5,748,924 A | 5/1998 | Llorens et al. | 710/129 |
| 5,768,530 A * | 6/1998 | Sandorfi | 709/233 |
| 5,768,623 A | 6/1998 | Judd et al. | 710/37 |
| 5,805,800 A | 9/1998 | Kotani et al. | 713/200 |
| 5,805,920 A | 9/1998 | Sprenkle et al. | 710/1 |
| 5,809,328 A | 9/1998 | Nogales et al. | 710/5 |
| 5,812,754 A | 9/1998 | Lui et al. | 714/6 |
| 5,835,496 A | 11/1998 | Yeung et al. | 370/514 |
| 5,848,251 A | 12/1998 | Lomelino et al. | 710/129 |
| 5,872,822 A * | 2/1999 | Bennett | 375/372 |
| 5,894,481 A * | 4/1999 | Book | 370/412 |
| 5,913,227 A | 6/1999 | Raz et al. | 711/152 |
| 5,941,969 A | 8/1999 | Ram et al. | 710/128 |
| 5,941,972 A | 8/1999 | Hoese et al. | 910/129 |
| 6,041,381 A | 3/2000 | Hoese | 710/129 |
| 6,061,753 A * | 5/2000 | Ericson | 710/107 |
| 6,118,776 A * | 9/2000 | Berman | 370/351 |
| 6,185,203 B1 * | 2/2001 | Berman | 370/351 |
| 6,219,771 B1 | 4/2001 | Kikuchi et al. | 711/164 |

OTHER PUBLICATIONS

Patent Abstracts of Japan of 5–225068 published Sep. 3, 1993; Hitachi Ltd.; *Access Control System for Security Software*.

Abstract of 1–181139 published Jul. 19, 1989, Sanyo Electric Co Ltd.; *Information Filing Device*.

Abstract of JP 3–105419 published May 2, 1991, Shikoku Nippon Denki Software K.K.; *Fixed Disk Device*.

Abstract of JP 8–251101 published Sep. 27, 1996, Hewlett Packard Co.; *Transfer Path Allocation System*.

"Fibre Channel Physical and Signaling Interface (FC–PH)" Rev. 4.3 Jun. 1, 1994.

* cited by examiner

FIG. 3

| Bit Byte | 31-24 | 23-16 | 15-8 | 7-0 |
|---|---|---|---|---|
| 0 | R_CTL | D_ID (DESIGNATED N_Port ADDRESS IDENTIFIER) 81 | | |
| 1 | Reserved | S_ID (SENDING N_Port ADDRESS IDENTIFIER) 82 | | |
| 2 | TYPE | F_CTL | | |
| 3 | SEQ_ID | DF_CTL | SEQ_CNT | |
| 4 | OX_ID | | RX_ID | |
| 5 | Parameter | | | |

CONTROL TABLE 140

| STORAGE REGION LOGICAL UNIT | HOST N_Port_Name | HOST INTERFACE (OR PORT) ON STORAGE CONTROLLER |
|---|---|---|
| LOGICAL UNIT 0 | HOSTA | CTL0P0 |
| LOGICAL UNIT 1 | HOSTB | CTL0P0 |

FIG. 11

| STORAGE REGION OPTICAL DISK MEDIUM | OPTICAL DISK DRIVE | HOST N_Port_Name | HOST INTERFACE (OR PORT) ON STORAGE CONTROLLER |
|---|---|---|---|
| MEDA | DRIVE0 | HOSTA | CTL0P0 |
| MEDB | DRIVE0 | HOSTA | CTL0P0 |
| MEDC | DRIVE0 | HOSTA | CTL0P0 |
| MEDD | DRIVE0 | HOSTB | CTL0P0 |
| MEDE | DRIVE0 | HOSTB | CTL0P0 |

CONTROL TABLE 160

APPARATUS FOR AND METHOD OF ACCESSING A STORAGE REGION ACROSS A NETWORK

BACKGROUND OF THE INVENTION

The present invention relates to storage control apparatus with ANSIX3T11-standardized fiber channels as an interface with its upper-level or "host" computers, and more particularly to a storage controller device which is employable in a computer system including a host computer and a storage control device plus a storage unit operable under control of the storage controller and which is for elimination of unauthorized access attempts upon issuance of a request to access the storage unit as sent from the host computer to the storage controller.

Conventionally, with regard to elimination or determent of unauthorized or illicit access attempts over networks, a variety of approaches are known and proposed until today.

One typical prior known approach to deterring unauthorized access has been disclosed in Published Unexamined Japanese Patent Application ("PUJPA") No. 3-152652, wherein a network security system between computer systems supporting the TCP/IP protocol includes a memory device for storage of predefined identification (ID) information of those users who are authorized to log-in the network. The security system has a function of interrupting or disenabling any connection to the network whenever an unauthorized person attempts to log-in the network for invasion or "hacking" purposes.

Another approach has been disclosed in PUJPA No. 63-253450, wherein the central processing device disclosed comes with an operating system that is designed to monitor or "pilot" entry of user ID, password and online address data thereby deterring any unauthorized access to resource files on disk drive units.

Still another approach is based on the "ESCON" interface architecture available from IBM corp., which is designed so that by utilizing the fact that a host computer stores therein a logical address thereof as the source address of the host computer in the form of a frame and transmits the same to a storage controller device, the storage controller has a function of checking whether an incoming logical address in such frame matches a logical address that has been preset in the storage controller.

Any one of the prescribed prior art, approaches are not more than a mere unauthorized access elimination means that is inherently directed to those interfaces with a single type of layer mounted on a host logical layer.

However, the ANSIX3T11-standardized fiber channel is the "network type" architecture, which is capable of providing the host logical layer with various built-in layers mountable thereon, such as for example TCP/IP, SCSI, ESCON, IPI and the like. More specifically, since the buffer contents are to be moved from one device to another in a way independent of the data format and contents, it may offer logical compatability with other interface configurations and therefore remain physically accessible without suffering from any particular limitations. Especially, in a storage system including this fiber channel and a storage device with a plurality of storage regions such as a disk array device or "subsystem," the storage regions are usable in common by an increased number of host computers. Accordingly, the prior art unauthorized access determent schemes remain insufficient in performance and reliability. A need thus exists for achievement of secrecy protection based on users' intentional security setup.

SUMMARY OF THE INVENTION

An object of the present invention is to provide a fiber channel connection storage control device adapted for use in a computer system which employs an ANSIX3T11-standardized fiber channel as an interface between one or more host computers and a storage control device and which includes host computers and a storage control device plus more than one storage device operable under control of the storage control device, wherein the fiber channel connection storage control device has a security function of, in the environment capable of physically receiving any access from the host computers, eliminating or deterring unauthorized access attempts from the host computers to the storage control device, which did not have any means for rejecting unauthorized access from host computers.

Another object of the present invention is to provide a fiber channel connection storage control device having a scheme capable of readily managing an accessible host computer or computers for elimination or determent of any unauthorized access from such host computers.

According to the present invention, the foregoing objects may be attainable in a way such that N_Port_Name information of an accessible host computer or computers which information distinctly identifies each host computer in a one-by-one basis is set in the storage control device for comparison with N_Port_Name information as stored in a frame to be sent from a host computer to thereby determine whether a presently desired access attempt is permissible or not.

One practical feature of the present invention in order to attain the prescribed objects is to have a means for inputting by use of a panel or the like the N_Port_Name information that is the information being issued from a host computer for distinct identification of the host computer, and then for storing such input information in a control memory of the storage control device as a control table. In this case, it will be desirable that the storage control device has a means for permanently storing therein the information until it is reset or updated.

And, by arranging the control table to be stored in a non-volatile control memory, it becomes possible to protect the management information even upon occurrence of any possible power supply failure or interruption.

In accordance with another practical feature of the present invention, after start-up of the host computer, the host computer generates and issues a frame that stores therein N_Port_Name information to the storage control device; the storage control device has means for comparing, when the storage control device receives this information, the maintained N_Port_Name information for distinct identification of the host computer to the N_Port_Name information as stored in the received frame: If the comparison results in a match between the two, then continue to execute the processing based on an instruction of the frame received; alternatively, if the comparison tells failure in match then return to the host computer an LS_RJT frame which rejects the presently received frame. It is thus possible for the storage control device to inhibit or deter any unauthorized access from the host computer.

A further practical feature of the present invention lies in presence of a means for setting N_Port_Name information items which are greater in number than or equal to a physical number of host interface units (ports) as owned by the storage control device. More specifically, a means is specifically provided for setting a plurality of N_Port_Name information items per port. This makes it possible to accommodate a multi-logical path configuration upon either a fiber channel fabric or a multi-logical path configuration upon switch connections.

Further, in a system having many magnetic disk volume parts such as a disk array device and also having a plurality of channel path routes, the system has manager means for performing management—within the storage control device in a one-to-one correspondence relation per channel path route—of storage regions under control of the storage control device, including a logical unit number (LUN)-based logical disk extent, a physical volume extent, a RAID group-based logical disk extent and the like, versus ports of the storage control device and N_Port_Name information of a host computer(s). This may enable users to deter an unauthorized access attempt per storage region, which in turn leads to achievement of more precise access management.

Furthermore in the present invention, even where the storage device under control of the storage control device is any one of an optical disk drive, magneto-optical (MO) disk drive and magnetic tape device as well as a variety of types of library devices of them, the storage control device has means for performing table based management and the storage information of a control table-based manager/holder means for dealing with the correspondence among the N_Port_Name information of an accessible host computer, ports of the storage control device, and the storage device, and further handling the correspondence management of media in the case of library apparatus, while simultaneously having a means for comparing, upon receipt of a frame as sent thereto, the information within the frame to the information in the control table, thereby eliminating unauthorized access attempts from host computers.

Moreover, the present invention comprises means for protecting the management information through inputting of a password upon setup of the information under management of the storage control device using a panel or the like. With such an arrangement, it is possible for users to eliminate any fraudulent registration of the information and also unauthorized resetting of the same. In addition, the users are capable of readily deter any unauthorized access by merely setting such management information thus reducing workloads on the users.

It should be noted that in the present invention, the means for setting the information as managed by the storage control device may be designed so that the use of the panel or the like is replaced with use of a utility program or programs of host computers to attain the intended setup operation.

In accordance with the present invention, in a computer system employing the ANSIX3T11-standardized fiber channel as the interface between host computers and a storage control device and also including the host computers, the storage control device and more than one storage device under control of the storage control device, it is possible to deter unauthorized access from any one of the host computers, which in turn makes it possible to attain the intended data secrecy protection within the storage device.

In addition, it becomes possible to precisely manage those access attempts from any one of the host computers in a one-to-one correspondence manner among the host computers and storage controller ports as well as storage regions; accordingly, the storage device may be efficiently utilized to meet the needs upon alteration of the usage per storage region.

These and other objects, features and advantages of the invention will be apparent from the following more particular description of preferred embodiments of the invention, as illustrated in the accompanying drawings.

BRIEF DESCRIPTION OF THE DRAWINGS

FIG. 3 is a diagram showing a format of a frame header which constitutes the frame shown in FIG. 2.

FIG. 5 shows one example of a sequence performing delivery of a data frame between a host computer and a device in the first practicing form, wherein FIG. 5(A) shows a sequence upon attempting of log-in.

FIG. 8 is a diagram showing a control table used by the storage controller for management of storage regions in the first practicing form.

FIG. 11 is a diagram showing a control table as managed by the storage controller in the second practicing form shown in FIG. 10.

DETAILED DESCRIPTION OF THE PREFERRED EMBODIMENTS

An explanation will first be given of a fiber channel and a storage system structured using the channel in accordance with the present invention with reference to FIGS. 1 to 5.

Figure 1:
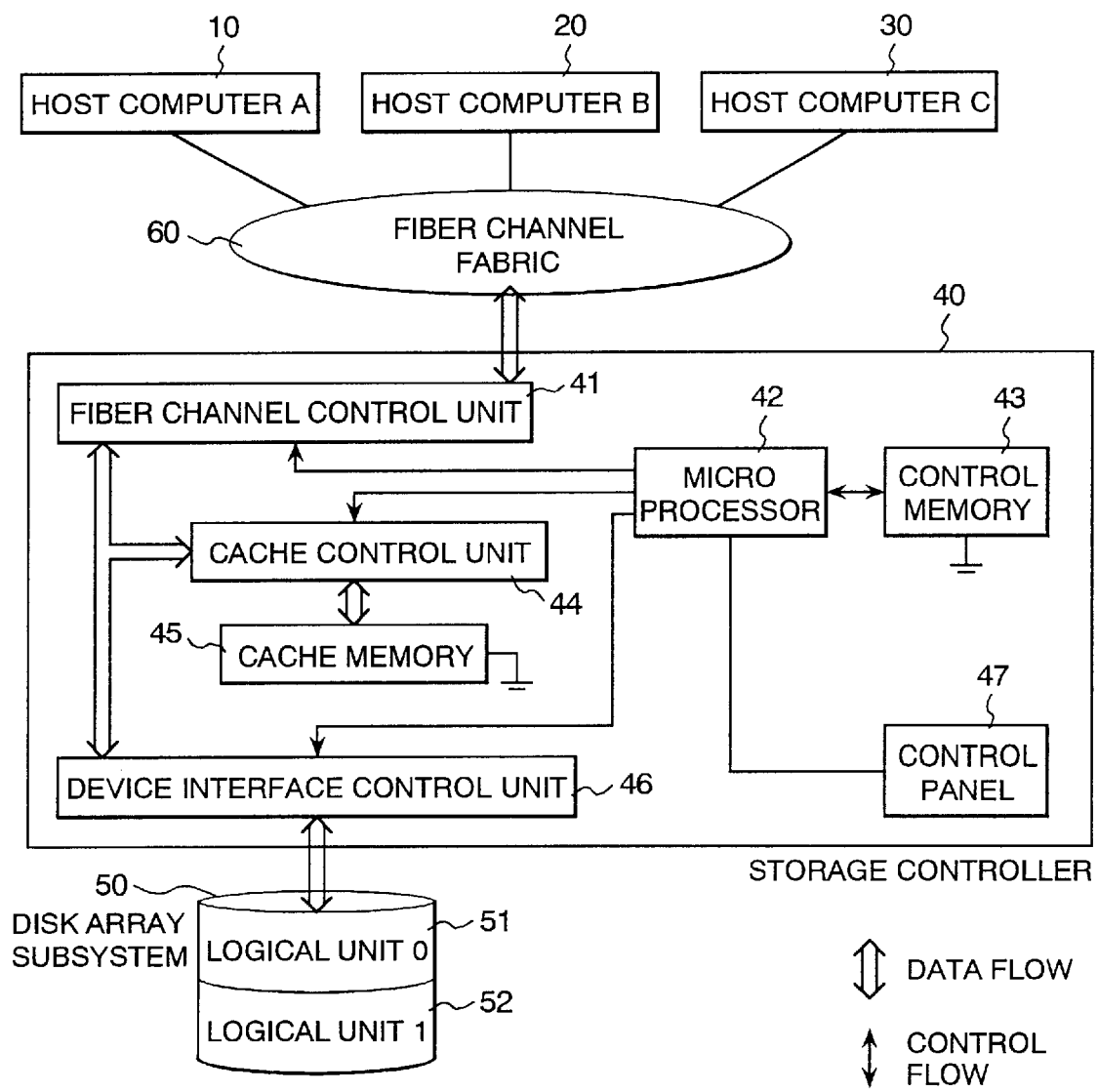
FIG. 1 is a diagram showing a hardware configuration of a first practicing form of the present invention.

FIG. 1 is a diagram showing a hardware configuration of the storage system in the case where a storage device operable under control of a storage controller unit are a disk array module or "subsystem." In FIG. 1, reference numerals 10, 20, 30 designate host computers each of which may be a central processing unit for executing data processing required.

Numeral 40 designates a storage controller unit of the disk array subsystem in which the principles of the present invention are implemented. As shown in FIG. 1, the storage controller 40 is constituted from a fiber channel control unit 41 which may be a protocol processor including a direct memory access (DMA) for controlling data transmission between it and the host computers 10, 20, 30, a microprocessor 42 for controlling all possible operations of the storage controller, a control memory 43 for storing therein microprograms for control of the operation of the controller along with control data associated therewith, a cache control unit 44 for controlling writing and reading data to and from the cache, a disk cache 45 for temporarily buffering write data and read data to/from a disk drive(s), a device interface control unit 46 which may be a protocol processor including DMA for controlling data transfer between it and its associative disk drives, and a panel 47 for use in inputting device configuration information to the storage controller.

Numeral 50 is the disk array subsystem operable under control of the storage controller 40. The disk array subsystem 50 is a device that stores therein data of host computers, which may be arranged to include therein a plurality of individual separate disks as disposed to have certain redundancy.

The disks constituting the disk array subsystem 50 are logically divided into portions or "partitions" which may be set at specified RAID levels different from one another. The partitions are called the RAID group. This RAID group is further logically subdivided into regions that may be SCSI access units called the logical units (LUs), each of which has its unique logical unit number (LUN) adhered thereto. In this embodiment, the disk array subsystem 50 illustrated herein comes with two LUs: an LU0 (51) that is the LU indicating the number LUN0, and LU1 (52) with the number LUN1.

It is noted that the number of LUs should not be exclusively limited to the two (2) as shown in FIG. 1 and may be increased more; in the case of single target functions, the LU may be maximally increased up to eight (8) per target.

It is also noted that while in this embodiment the storage regions called the LUs are used as the access units, such storage regions each acting as the access unit may alternatively be those storage,regions with a physical volume being as the unit or with a RAID group as unit.

The host computers 10, 20, 30 and storage controller 40 employ a fiber channel 60 as the interface, and are connected together via a device known as the "fabric."

An operation of the system shown in FIG. 1 will be explained under the assumption that the operation is performed in one exemplary case where the host computer 10 performs data transfer toward the disk array subsystem 50 by way of the storage controller 40. The following description will mainly deal with the flow of control and the data flow.

When the host computer 10 generates and issues an access request, the fiber channel control unit 41 recognizes such request then issuing a task interruption request to the microprocessor 42. In turn, the microprocessor 42 causes the control memory 43 to store therein both command information from the host computer and necessary control information required in this invention.

If the command information is a write command, then the microprocessor 42 instructs the fiber channel control unit 41 to execute data transfer and then stores the transferred data in the cache 45 via the cache controller 44. With respect to the host computer 10, the fiber channel control unit 41 issues a write completion report thereto. After completion of such write completion reporting, the microprocessor 42 controls the device interface controller 46 thus permitting data and redundancy data to be written into the disk array subsystem 50. In this case, during ordinary or standard RAID5 operations, a new parity is created based on the old data and old parity as well as new data; on the contrary, according to the control scheme of this invention, the microprocessor 42 does the same using the device interface controller 46 and the cache control unit 44 as well as the control memory 43 plus the cache 45.

On the other hand, upon receipt of read command information as the command information from the host computer 10, the microprocessor 42 sends an instruction to the device interface control unit 46 for providing access to the disk array subsystem 50 which stores therein the data block of this access request to read data therefrom, which data will then be stored into the cache 45 through the cache control unit 44. The microprocessor 42 issues an instruction to the fiber channel control unit 41; the fiber channel control unit 41 in turn transfers the data stored in the cache 45 toward the host computer 10 and then sends a read completion report to the host computer after completion of the data transfer required.

Next, a technical advantage of the fiber channel 60 will be explained as follows. The fiber channel may be a high-speed interface capable of transferring data at 100 MB/s at a distance of 10 km in maximum. The fiber channel's architecture is designed to send data from a "source" buffer to its "destination" buffer while moving the buffer contents from one device to another in a way independent of the format and contents of data per se; accordingly, any overhead which processes different network communications protocols will no longer take place thus enabling achievement of high-speed data transmission. A variety of kinds of layers may be built in the upper-level logical layer, such as for example TCP/IP, SCSI, ESCON, IPI and the like. In other words, it does have the logical compatibility with other interfaces. The device called the fabric is expected to execute the complicated device-to-device connection/exchange function, which leads to the capability of organization of a multi-layered logical bus configuration.

The basic unit based on which the fiber channel exchanges or distributes data is called the "frame." Next, this frame will be explained with reference to FIG. 2.

Figure 2:
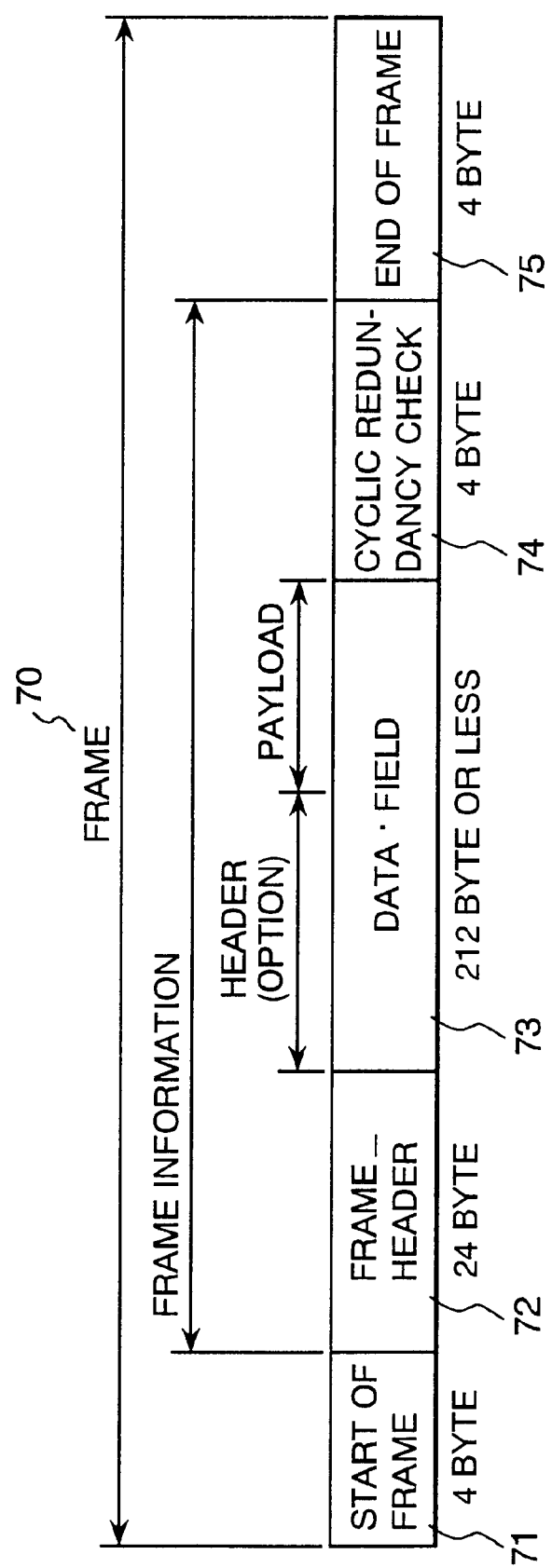
FIG. 2 is a diagram showing a format of a frame in the first practicing form.

As shown in FIG. 2, a frame 70 is configured from a start-of-frame (SOF) section 71, frame header 72, data field 73, cyclic redundancy check (CRC) 74, and end-of-frame (EOF) 75.

The SOF 71 is an identifier of 4 bytes which is put at the top of the frame.

The EOF 75 is a 4-byte identifier at the last location of the frame; a combination of SOF 71 and EOF 75 indicates the boundary of frame. In the fiber channel, an "idle" signal or signals flow therein in cases where any frames are absent.

The frame header 72 contains therein a frame type, host protocol type, source and destination's N_Port_ID information, N_Port_Name information and the like. The N_Port_ID is information indicative of an address, whereas N_Port_Name represents a port identifier.

The header of upper-level layer may be put at the top part of the data field 73. This is followed by a payload section which carries data per se. CRC 74 is a 4 byte check code for use in checking or verifying the frame header and data in the data field., The frame header 72 has a format 80 as shown in FIG. 3. In the frame header format 80, a destination identifier (D_ID) 81 is an address identifier on the frame reception side, and a source identifier (S_ID) 82 is an identifier indicative of the N_Port address on the frame transfer side, each of which may involve N_Port_ID, N_Port_Name information, etc.

Figure 4A:
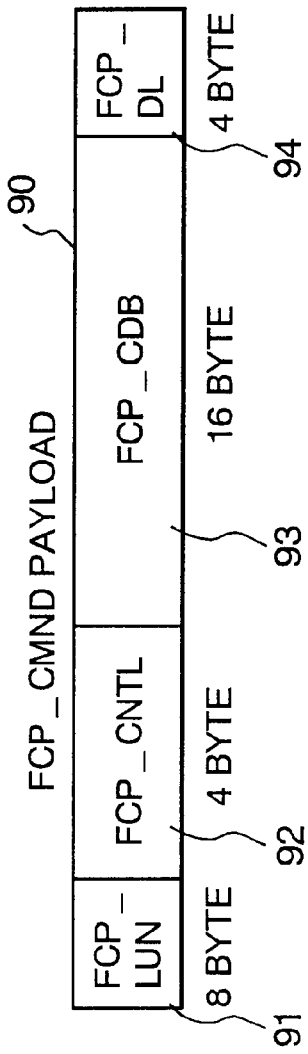
FIG. 4(A) is a format diagram of a payload of FCP_CMND which is one of frames shown in FIG. 2; and, FIG. 4(B) is a format diagram of FCP_CDB constituting the payload.
Figure 4B:
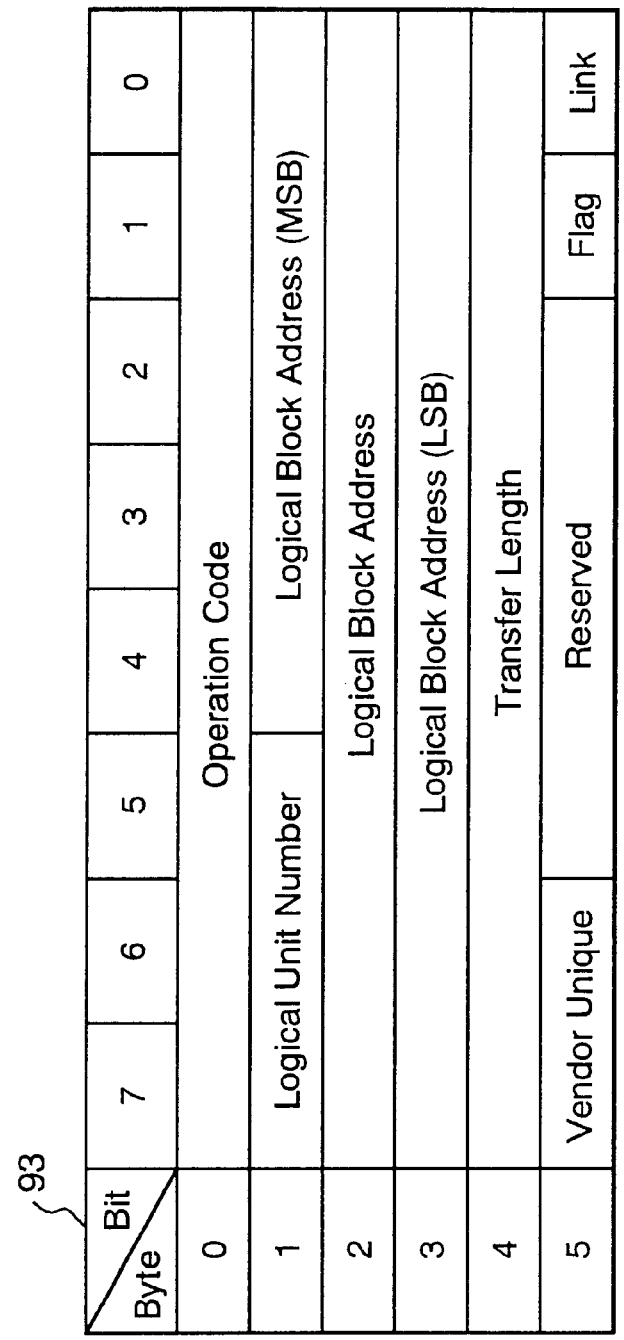

An explanation will next be given of a payload 90 of fiber channel protocol command FCP_CMND, which stands for fiber channel protocol for SCSI command and which is one of payloads of the data field 73 constituting the frame, in conjunction with FIGS. 4(A) and 4(B).

A logical unit number LUN for issuance of a command is assigned to an FCP logical unit number (FCP_LUN) field 91. A command control parameter is assigned to an FCP control (FCP_CNTL) field 92. And, an SCSI command descriptor block is stored in an FCP command descriptor block (FCP_CDB) field 93 for indication of a command type such as a read command "Read" or the like, an address such as LUN, and a block number. The amount of data to be transferred in response to the command is designated by byte number in an FCP data length (FCP_DL) field 94.

Data exchange/distribution operations are executed by use of the frame thus arranged as described above.

Frames employed herein may be generally classified based on function into a data frame and link control frame. The data frame is for use in transferring information, and thus has data and command as used by the host protocol, which are built in the payload section of the data field thereof.

On the other hand, the link control frame is typically used for indication of a success or failure of frame distribution. There may be a frame or the like for use in indicating actual receipt of a single frame or in notifying a parameter concerning transmission in log-in events.

Next, the "sequence" will be explained with reference to FIG. 5. The sequence in the fiber channel may refer to a collection of data frames concerned which will be unidirectionally transferred from one N_Port to another N_Port, the sequence corresponding to the phase in SCSI. A collection of such sequences is called the "exchange." One example is that a collection or group of certain sequences will be called the exchange, which sequences undergo exchange/distribution processing for execution of a command within a time period spanning from the issuance of such command to the completion of command execution (including command issuance, data transmission, and completion reporting). As apparent from the foregoing description, the "exchange" may be equivalent to I/O of SCSI.

Figure 5A:
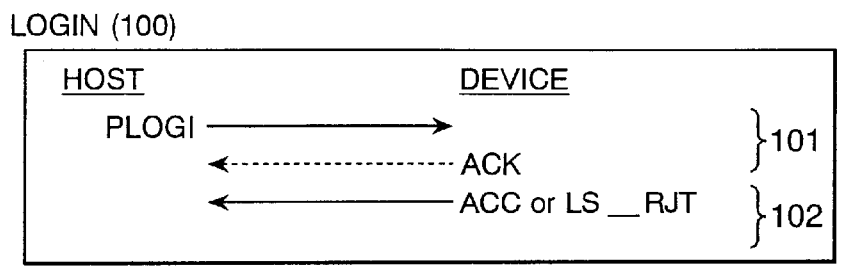
Figure 5B:
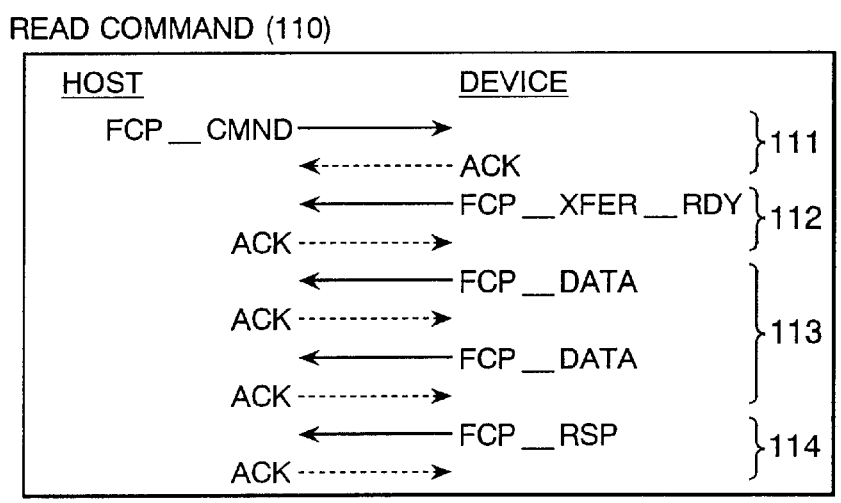
FIG. 5(B) is a sequence diagram when execution of a read command.
Figure 5C:
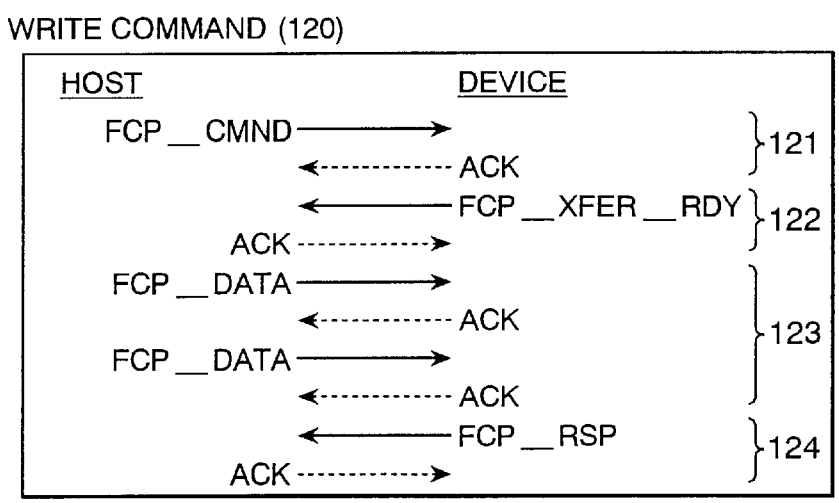
FIG. 5(C) is a sequence diagram upon receipt of a write command.

FIGS. 5(A), 5(B) and 5(C) show a log-in sequence (100), read command sequence (110), and write command sequence (120), respectively.

In the fiber channel interface, the intended communication becomes available in a particular event in which the host computer sends the device a port log-in (N_Port Login) frame containing a communication parameter, and then the device actually receives this frame. This will be called the "log-in." FIG. 5(A) shows such log-in sequence (100).

In the log-in sequence (100) shown in FIG. 5(A), the host computer first sends a PLOGI frame to the device at a sequence 101 thereby to require a log-in attempt. The device in turn sends an acknowledge (ACK) frame to the host computer thereby informing it of actual receipt of the PLOGI frame.

Then, at a sequence 102, the device operates to send the host computer either an accept (ACC) frame if the log-in request is accepted or a link service reject (LS-RJT) frame if the request is to be rejected.

Next, the read command sequence (110) of FIG. 5(B) will be explained.

In a sequence 111, the host computer sends the FCP_CMND frame to the device for requiring execution of a read operation. The device then sends back the ACK frame to the host computer.

At sequence 112, the device sends the host computer an FCP transfer ready (FCP_XFER_RDY) frame thereby notifying it of completion of preparation for data transmission. The host computer then sends the ACK frame to the device.

The routine goes next to sequence 113 which permits the device to send the host computer an FC data (FC_DATA) frame and then transfer data thereto. The host computer sends back ACK frame to the device.

At the next sequence 114, the device sends the FCP_RSP frame to the host computer to thereby inform it of successful completion of data transmission required. The host computer then sends back ACK frame to the device.

An explanation will next be given of the write command sequence (120) of FIG. 5(C).

At sequence 121, the host computer sends the device an FCP_CMND frame to perform issuance of a write request. In turn, the device sends ACK frame to the host computer.

Then at sequence 122, the device sends FCP_XFER_RDY frame to the host computer in order to inform it of the fact that data writing is available. The host computer sends ACK frame to the device.

Further, in sequence 123, the host computer sends FCP_DATA frame to the device for execution of data transfer. The device then sends ACK frame to the host computer.

Lastly at sequence 124, the device sends the host computer an FCP response (FCP_RSP) frame thereby notifying it of successful completion of data reception concerned. The host computer then sends ACK frame to the device.

While the general system configuration and format plus sequences have been explained in conjunction with FIGS. 1 to 5(C), a security check scheme incorporating the principles of the present invention will be explained below.

A security check scheme will first be explained which employs the N_Port_Name information during PLOGI processing.

In accordance with the invention, a first operation to be done in FIG. 1 is that the user sets or establishes a list of one or several host computers that may provide access to the microprocessor 42 of the storage controller 40 prior to start-up of the host computers 10, 20, 30. More specifically, the N_Port_Name and N_Port_ID information capable of identifying such host computer(s) may be input using the panel 47. When this is done, in order to attain the secrecy protection function upon inputting to the panel, entry of a password should be required upon inputting of the information to thereby enhance the security.

After input of the password, if such input password matches a preset password, then input the N_Port_Name information of more than one accessible host computer with respect to each port of the storage controller to thereby store the input information in the control table.

Figure 6:
FIG. 6 is a diagram showing a control table used by a storage controller in controlling a host computer or computers in the first practicing form.

Now, assume for example that the host computers 10, 20 are capable of getting access to the disk array subsystem 50 whereas the host computer 30 is incapable of accessing disk array subsystem 50. Assume also that the N_Port_Name is such that the host computer 10 is HOSTA, host computer 20 is HOSTB, and host computer 30 is HOSTC. Suppose that the port of the fiber channel control unit 41 of the storage controller 40 is CTL0P0. If this is the case, the resulting log-in request control table 130 is as shown in FIG. 6., By establishing this log-in request control table 130 shown in FIG. 6 in a nonvolatile memory, it becomes possible to protect the management information against any possible power interruption or failure.

In addition, the information stored in the log-in request control table 130 is saved in the hard disk region 50 upon occurrence of power off. Or alternatively, upon updating of information, reflection is performed to the memory 43 and the disk 50. This may enable the storage controller 40 to permanently hold or store therein the information until it is subject to resetting or re-establishment.

It should be noted that while the "self" node information for use in identifying nodes and/or ports in the fiber channel may also involve N_Port_ID other than the N_Port Name, it is desirable that the N_Port_Name information be used as an object to be checked for security. This is because of the fact that the N_Port_ID will possibly be altered or modified and is not the numeral value under management by the users.

Figure 7:
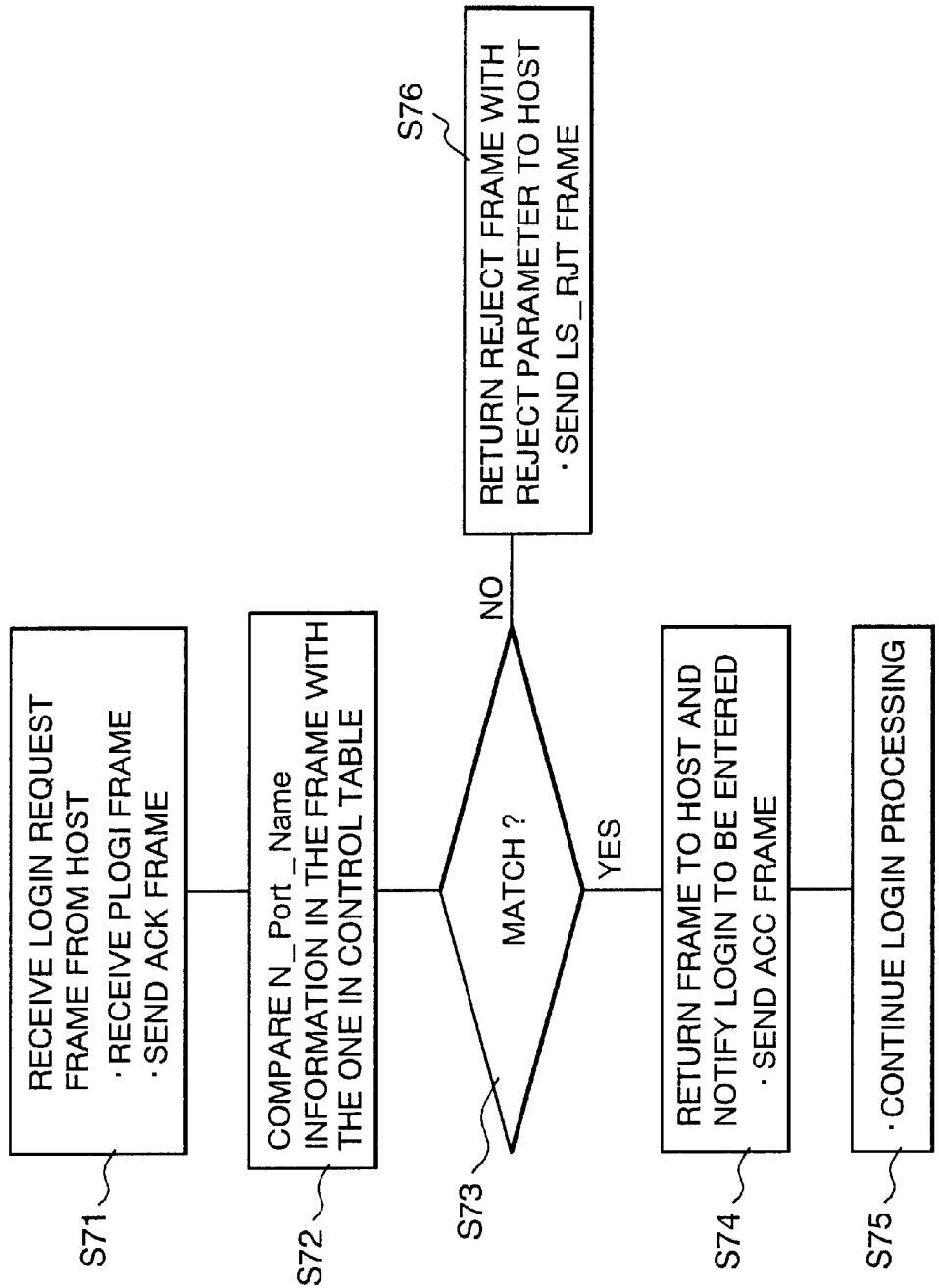
FIG. 7 shows a flow chart of frame processing as executed by the storage controller upon issuance of a log-in request from an upper-level computer (host) in the first practicing form.

Next, an explanation will be given of a frame processing procedure of the storage controller in reply to issuance of a log-in request from a host computer with reference to FIGS. 1 and 7.

(Step S71)

The host computers 10, 20, 30 start up each issuing a PLOGI frame, which is the log-in request frame storing therein the N_Port_Name information. Upon receipt of such frame, the microprocessor 42 of the storage controller 40 sends back each host computer an ACK frame representative of actual receipt of the frame.

(Step S72)

And, the microprocessor 42 attempts to extract N_Port Name information as stored in the frame, and then performs comparison for determining whether such N_Port_Name information has already been registered in the N_Port_Name list within the presently available preset control table.

(Step S73), (Step S74), (Step S75)

The N_Port_Name information that is presently stored in the frames issued from the host computers 10, 20 may match the N_Port_Name information which has been registered within the control table so that the microprocessor 42 of the storage controller 40 returns the ACC frame to the host computers 10, 20 as a mark of actual receipt of the individual log-in request while simultaneously continuing to execute the log-in processing.

(Step S73), (Step S76)

On the other hand, the N_Port_Name information stored in the frame as issued from the remaining host computer 30 fails to match the N_Port_Name information registered in the control table so that the microprocessor 42 of storage controller 40 returns to the host computer 30 an LS_RJT frame which contains therein a reject parameter for rejection of its connection attempt.

In the way as described above, by causing the storage controller 40 to manage the one-to-one correspondence of those ports of the host computers and the storage controller using the log-in request control table 130, it is possible for users to prevent any unauthorized access attempts from host computers on a port-by-port basis thereby maintaining enhanced security.

Next, one preferred methodology will be described which is for practicing the security check scheme using the N_Port_Name information per LUN that is the storage region of the disk array subsystem in accordance with the principles of the present invention.

In accordance with the invention, first establish a list of those accessible host computers per LUN to the microprocessor 42 of storage controller 40 before startup of the host computers 10, 20, 30. Then, input using the panel 47 certain information such as the N_Port_Name or N_Port_ID information or the like capable of identifying the host computers. When this is done, request entry of a password upon inputting of such information in order to achieve the secrecy protection function through input to the panel 47, thereby enhancing the security.

After inputting such password, if this matches the preset password, then input the port of storage controller along with the N_Port_Name information of one or several accessible host computers, thereby storing the input information in the control table.

Assume here that the LU0 (51) is accessible from the host computer 10 via a port of the fiber channel control unit 41 of the storage controller 40 whereas the LU1 (52) is accessible from the host computer 20 via a port of fiber channel control unit 41 of storage controller 40. Suppose that regarding the N_Port_Name, the host computer 10 is HOSTA while host computer 20 is HOSTB. Imagine that a port of fiber channel control unit 41 of storage controller 40 is CTL0P0. If this is the case, an I/O request control table 140 is as shown in FIG. 8.

This I/O request control table 140 shown in FIG. 8 is established in the storage space of a nonvolatile memory thereby making it possible to protect the management information against loss or destruction due to any accidental power interruption or failure.

In addition, upon occurrence of power off, the information stored in the I/O request control table 140 shown in FIG. 8 is to be stored in the hard disk region 50. Or alternatively, reflection is carried out to the memory 43 and disk 50 upon updating of information. This makes it possible to permanently hold or maintain the information until it is reestablished at later stages.

Although in this embodiment the channel path route is single, the same goes with other systems having a plurality of channel path routes.

Figure 9:
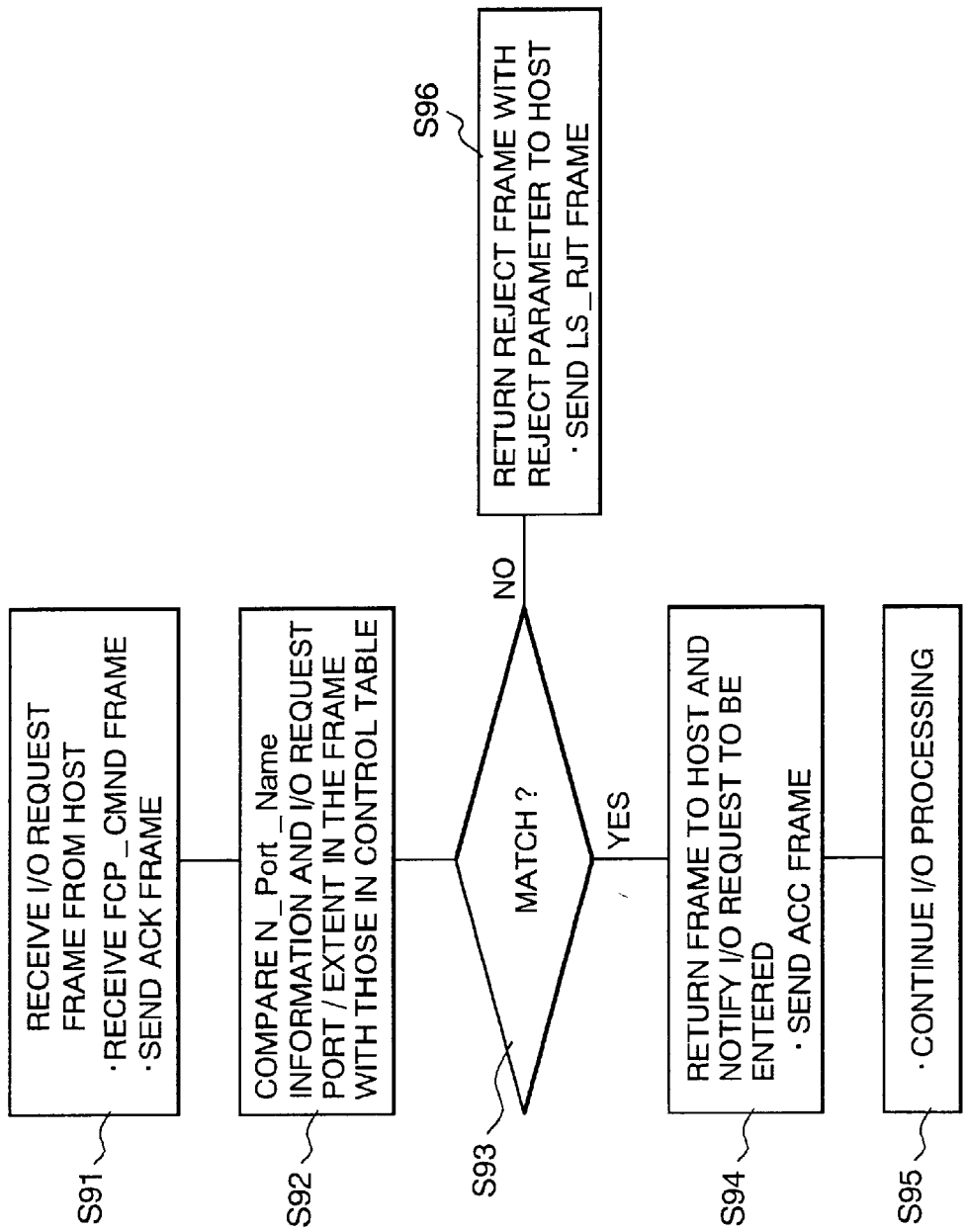
FIG. 9 shows a flow chart of frame processing as executed by the storage controller upon issuance of an I/O request from the host in the first practicing form.

A frame processing procedure of the storage controller in response to issuance of the I/O request from more than one host computer will now be explained in conjunction with FIGS. 1 and 9. While in the prior example stated supra the security check was done in the course of PLOI, the check is performed per SCSI command in this embodiment.

(Step S91)

Where the host computer 10 desires to issue the I/O request to LU0 (51), the host computer 10 generates and issues a specific frame storing therein SCSI CDB toward the storage controller 40. Upon receiving of this frame, the storage controller 40 first sends back the ACK frame representative of actual receipt of this frame.

(Step S92)

And, the microprocessor 42 extracts the N_Port_Name information stored in the frame along with the LUN number within the CDB, and then performs comparison to determine whether such N_Port_Name information and LUN number are registered to the list within the control table which has been preset and maintained presently.

(Step S93), (Step S94), (Step S95)

Since the content "the host computer 10 can access LU0(51)" has been registered in the management table, the microprocessor 42 of the storage controller 40 receives the command and continues execution of I/O processing.

(Step S91)

On the other hand, where the host computer 20 issues an I/O request frame of LU0 (51), when the storage controller 40 does receive this frame storing therein the SCSI CDB, the microprocessor 42 first returns to the host computer 20 the ACK,frame indicative of actual receipt of this frame.

(Step S92)

And, the microprocessor 42 operates to extract both the N_Port_Name information stored in the frame and the LUN number within CDB, and then executes search processing to thereby determine whether such N_Port_Name information and LUN number are present in the management table.

(Step S93), (Step S96)

Suppose that the search reveals the absence of any combination of its corresponding LUN and N_Port_Name in the management table. If this is the case, the microprocessor 42 of storage controller 40 sends an LS_RJT frame to the host computer 20 for rejection of the I/O request thereof.

In this way, the storage controller may prevent any unauthorized access attempts.

Although the explanation herein was devoted to the log-in and I/O request frames, any other information may be employed for comparison, including but not limited to the N_Port_Name information as stored in any one of the other host computer frames.

It must be noted that the storage device under control of the fiber channel connection storage controller should not exclusively be limited to the disk array subsystem stated supra, and the principles of the present invention may alternatively be applicable to any systems employing an optical disk drive, magneto-optical disk drive and magnetic tape storage as well as library apparatus including one or several of them in combination.

Figure 10:
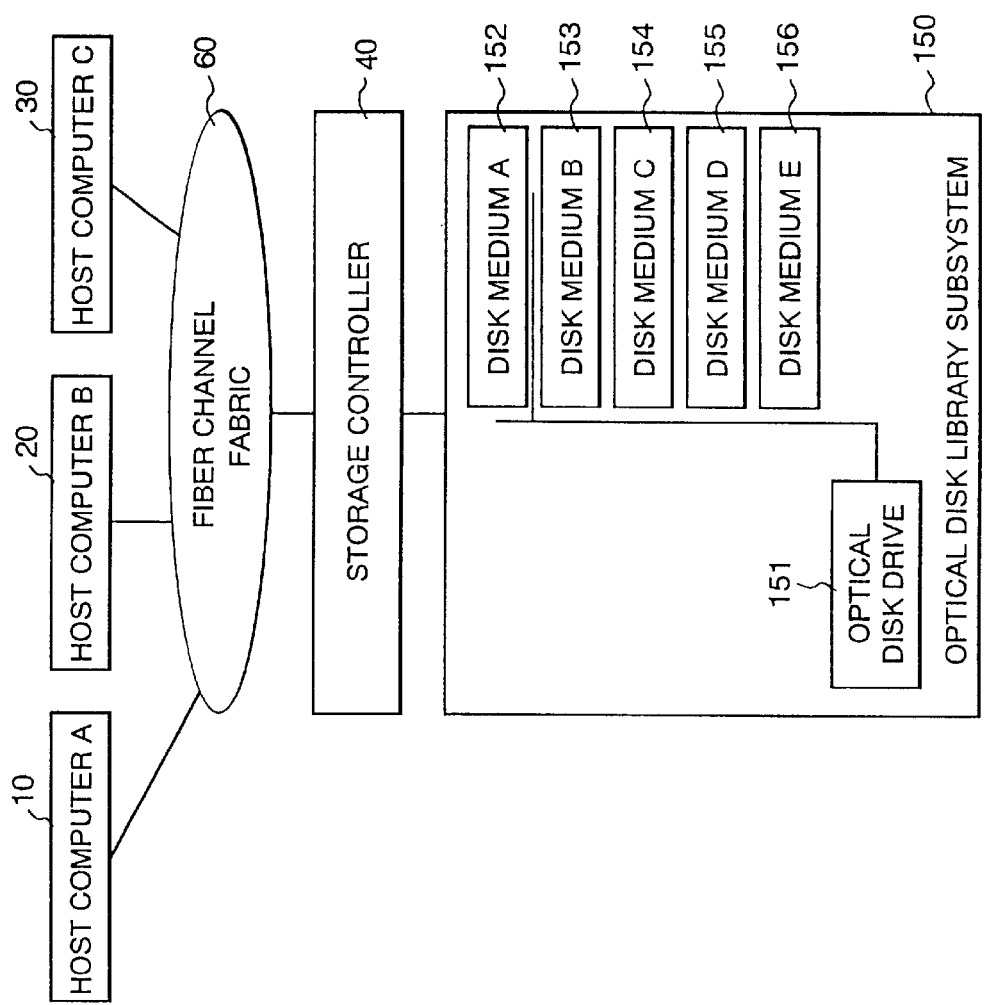
FIG. 10 is a diagram showing a hardware configuration in the case where the storage device under control of the storage controller is an optical disk library as a second practicing form of the present invention.

A summary of the case where the present invention is applied to a system including its storage device under control of the storage controller which is configured from an optical disk device or "subsystem" will be explained with reference to FIG. 10. Reference numeral 150 designates such optical disk library subsystem under control of the storage controller 40; numeral 151 indicates an optical disk drive; 152 to 156, optical disk media.

The user is expected before startup of the host computers 10, 20, 30 to make use of the panel to establish a correspondence relation among the individual medium and drive as well as port relative to the N_Port_Name information while maintaining in a micro-program the right or authorization of accessibility of host computers.

Assume that those media 152, 153, 154 are accessible from the host computer 10 whereas media 155, 156 are accessible from host computer 20. Suppose that the N_Port_Name information of host computer 10 is HOSTA, that of host computer 20 is HOSTB. Suppose also that the port of storage controller 40 is CTL0P0, that of optical disk drive 151 is DRIVE0, and those of respective media 152, 153, 154, 155 and 156 are MEDA, MEDB, MEDC, MEDD and MEDE. In this case, a request control table 160 is as shown in FIG. 11.

When respective host computers generate and issue I/O request frames, volume information must be stored in CDB in the payload constituting each frame; accordingly, the storage controller 40 is responsive to receipt of the frame for comparing both the N_Port_Name information within the frame and a medium identifier within the payload to corresponding items as presently stored in the control table which has been preset and held in the storage controller 40. In this way, applying the principles of the invention may enable the storage controller to eliminate any possible unauthorized access attempts from the host computers.

What is claimed is:

1. A storage system adapted to be coupled to a plurality of host computers, comprising:
    at least one storage device for storing data, said storage device divided into a plurality of storage regions; and
    a table for managing correspondence between said host computers and said plurality of storage regions, said table containing distinct identification information for said host computers and associated identification information for respective ones of said plurality of storage regions, and said table authorizing access to one of said storage regions in said storage device by one of said host computers by using said distinct identification information and said associated identification information.

2. A storage system adapted to be coupled to a plurality of host computers via fibre channel, comprising:
    at least one storage device for storing data, said storage device having a plurality of storage regions;
    a storage controller for controlling access from said host computers to said storage device comprising:
        a channel controller adapted to be coupled to said host computers via fibre channel for controlling data transfer from and to said host computers;
        a device interface controller for controlling data transfer from and to said storage devices;
        a cache for temporarily buffering write-data from said host computers, and read-data from said storage devices; and
        a table for managing correspondence between said host computers and said plurality of storage regions in response to distinct identification information and associated identification information for respective ones of said plurality of storage regions stored in said table, said table authorizing access from one of said host computers to a respective one of said plurality of storage regions in said storage device by using said distinct identification information and said associated identification information.

3. The storage system according to claim 2, wherein said fibre channel is a standardized ANSI X3T11 fibre channel.

4. The storage system according to claim 2, wherein said plurality of storage regions comprise logical units, volume units, or units of a RAID group.

5. The storage system according to claim 4, wherein said plurality of storage regions are logical volume units.

6. A storage system adapted to be coupled to a plurality of host computers via fibre channel, comprising:
    at least one storage device for storing data, said storage device having a plurality of storage regions;
    a storage controller for controlling access between said host computers and said storage device comprising:
        a channel controller adapted to be coupled to said host computers by fibre channel for controlling data transfer from and to said host computers;
        a device interface controller for controlling data transfer from and to said storage device;
        a cache for temporarily buffering write-data from said host computers, and for temporarily buffering read-data from said storage devices; and
        a table for managing correspondence between said host computers and said plurality of storage regions in response to distinct identification information and associated identification information for respective ones of said plurality of storage regions stored in said table, said table authorizing access from one of said host computers to one of said storage regions in said storage device by using said distinct identification information and said associated identification information.

7. A storage system adapted to be coupled to a plurality of host computers via fibre channel, comprising:
    at least one storage device for storing data, said storage device having a plurality of volumes;
    a storage controller for controlling access from said host computers to said storage device comprising:
        a channel controller adapted to be coupled to said host computers by fibre channel for controlling data transfer from and to said host computers;

a device interface controller for controlling data transfer from and to said storage device;

a cache for temporarily buffering write data from said host computers, and for temporarily buffering read data from said storage devices; and a table for managing correspondence between said host computers and said plurality of volumes in response to Name information for said host computers and associated identification information for respective ones of said plurality of volumes stored in said table, said table authorizing access from one of said host computers to one of said volumes in said storage device by using said Name information and said associated identification information, wherein said storage controller prevents unauthorized access from one of said host computers to one of said volumes.

8. A storage system adapted to be coupled to a plurality of host computers, comprising:

at least one storage device for storing data, said storage device divided into a plurality of volumes; and a table for managing correspondence between said host computers and said plurality of volumes in response to Name information for identifying said host computers and associated identification information for respective ones of said plurality of volumes stored in said table, said table authorizing access from one of said host computers to one of said volumes in said storage device by using said Name information and said associated identification information.

9. A method of accessing a storage system comprising a storage controller for transferring data between a plurality of host computers, and at least one storage device for storing data from said host computers, comprising the steps of:

dividing said storage device into logical regions;

providing a table indicating which of said host computers can access to which of said logical regions of said storage device by using Name information which identifies said host computers and associated identification information for respective ones of said logical regions; and authorizing access to a logical region only from said identified host computers in response to said Name information and said associated identification information in said table.

10. A method of accessing a storage system connected to a plurality of computers via a fibre channel network, comprising the steps of:

receiving a first relation between a first computer and one of a plurality of volumes in said storage system;

receiving a second relation between a second computer and one of said plurality of volumes in said storage system;

receiving a first message containing distinct identification information for said first computer and associated identification information for one of said plurality of volumes to access a first associated one of said plurality of volumes from said first computer;

sending a response message to said first computer from said storage system according to said first relation, said response message to said first computer allowing said first computer to access said first associated one of said plurality of volumes;

receiving a second message containing distinct identification information for said second computer and associated identification information for one of said plurality of volumes to access said second associated one of said plurality of volumes from the second computer; and sending a response message to said second computer from said storage system according to said second relation, said response message to said second computer not allowing said second computer to access said second associated one of said plurality of volumes.

11. The access method according to claim 10, wherein said first relation comprises Name information of said first computer and wherein said second relation comprises Name information of said second computer.

12. A storage system adapted to be coupled to a plurality of host computers, comprising:

a storage device divided into a plurality of storage regions; and a table adapted to store distinct identification information and associated identification information for respective ones of said plurality of storage regions indicating authorized access by said plurality of host computers to respective ones of said storage regions.

13. A storage system adapted to be coupled to a plurality of computers via fibre channel, comprising:

a storage device having a plurality of storage regions;

a storage controller comprising:

a channel controller adapted to be coupled to said computers via fibre channel;

a device interface controller coupled to said storage device;

a cache interposed between said storage device and said interface controller; and a memory adapted to store distinct identification information and associated identification information for respective ones of said plurality of storage regions indicating authorized access by said plurality of computers to respective ones of said plurality of storage regions.

14. A storage system adapted to be coupled to a plurality of computers via fibre channel, comprising:

a storage device having a plurality of volumes;

a storage controller comprising:

a channel controller adapted to be coupled to said computers via fibre channel;

a device interface controller coupled to said storage device;

a cache interposed between said storage device and said interface controller; and a memory containing a table adapted to store Name information and associated identification information for respective ones of said plurality of volumes indicating authorized access by said plurality of computers to respective ones of said plurality of volumes.

15. A storage system adapted to be coupled to a plurality of host computers, comprising:

a storage device divided into a plurality of volumes; and a table adapted to store distinct identification information and associated identification information for respective ones of said plurality of volumes indicating authorized access by said plurality of host computers to respective ones of said plurality of volumes.

16. A medium that stores instructions adapted to be executed by a processor to manage authorized access by a plurality of host computers to respective ones of a plurality of storage regions in a storage device in response to distinct identification information for said host computers and associated identification information for respective ones of said plurality of storage regions stored in a table, said instructions authorizing access from one of said host computers to a respective one of said regions in said storage device by using said distinct identification information and said associated identification information, wherein said processor prevents unauthorized access from one of said host computers to one of said regions.

17. The medium of claim 16, wherein said instructions include instructions to:
allow access to a region only from host computers identified in said table in response to said information in said table.

18. The medium of claim 16, wherein said instructions include instructions to:
receive an FCP command in a frame having identification information from one of said host computers;
recognize which host computer has sent said FCP command by said identification information;
judge whether said recognized host computer can be permitted access to a region or not; and
accept said access from said host computer when said judging is acceptable.

19. The medium of claim 16, wherein said instructions include instructions to:
receive a first relation between a first computer and one of a plurality of volumes in said storage system;
receive a second relation between a second computer and said one of said plurality of volumes in said storage system;
receive a first message to access said one of said plurality of regions from a first computer;
send a response message to said first computer from said storage system according to said first relation, said response message to said first computer allowing said first computer to access said one of said plurality of volumes;
receive a second message to access said one of said plurality of regions from a second computer; and
send a response message to said second computer from said storage system according to said second relation, said response message to said second computer not allowing said second computer to access said one of said plurality of volumes.

20. A method of managing correspondence between a plurality of host computers and a plurality of storage regions in a storage device in response to distinct identification information for said host computers and associated identification information for respective ones of said plurality of storage regions stored in a table, comprising authorizing access from one of said host computers to a respective one of said plurality of storage regions in said storage device by using said distinct identification information and associated identification information such that a processor prevents unauthorized access from one of said host computers to one of said regions.

21. A storage system adapted to be coupled to a plurality of computers via fibre channel, comprising:
a storage device divided into a plurality of storage regions; and
a table adapted to store distinct identification information and associated identification information for respective ones of said plurality of storage regions indicating authorized access by said plurality of computers to respective ones of said plurality of storage regions.

22. A storage system adapted to be coupled to a plurality of computers, comprising:
a storage device having a plurality of storage regions;
a storage controller comprising:
a channel controller coupled to said computers;
a device interface controller coupled to said storage device;
a cache interposed between said storage device and said interface controller; and
a memory adapted to store distinct identification information and associated identification information for respective ones of said plurality of storage regions indicating authorized access by said plurality of computers to respective ones of said plurality of storage regions.

23. A storage system adapted to be coupled to a plurality of computers, comprising:
a storage device having a plurality of volumes;
a storage controller comprising:
a channel controller coupled to said computers;
a device interface controller coupled to said storage device;
a cache interposed between said storage device and said interface controller; and
a memory adapted to store Name information and associated identification information for respective ones of said plurality of volumes indicating authorized access by said plurality of computers to respective ones of said plurality of volumes.

24. A storage system adapted to be coupled to a plurality of computers, comprising:
a storage device divided into a plurality of volumes; and
a table adapted to store distinct identification information and associated identification information for respective ones of said plurality of volumes indicating authorized access by said plurality of computers to respective ones of said plurality of volumes.

* * * * *